(12) United States Patent
Lin et al.

(10) Patent No.: US 6,564,161 B1
(45) Date of Patent: May 13, 2003

(54) ARRANGEMENT FOR TESTING LIGHT EMITTING DIODE INTERFACE OF AN INTEGRATED NETWORK DEVICE

(75) Inventors: Chong Chang Lin, San Jose, CA (US); Harand Gaspar, Cupertino, CA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 265 days.

(21) Appl. No.: 09/726,448

(22) Filed: Dec. 1, 2000

(51) Int. Cl.[7] ................................................ G01R 31/02
(52) U.S. Cl. ........................................ 702/117; 324/763
(58) Field of Search ................................... 702/117, 118, 702/120, 57–59, 182, 183, 184, 185; 324/502, 508, 512, 522, 527, 763, 767, 153

(56) References Cited

U.S. PATENT DOCUMENTS 4,611,116 A * 9/1986 Batt .......................... 250/239
5,598,418 A * 1/1997 Lo et al. ..................... 370/501
5,623,691 A * 4/1997 Clohset et al. ................ 710/1
5,953,335 A 9/1999 Erimli et al.
6,028,441 A * 2/2000 Alvord et al. ............... 324/767
6,150,774 A * 11/2000 Mueller et al. ............. 315/291
6,423,020 B1 * 6/2001 Lam et al. ................ 340/815.4

* cited by examiner

Primary Examiner—Marc S. Hoff
Assistant Examiner—Edward Raymond
(74) Attorney, Agent, or Firm—Manelli Denison & Selter PLLC; Leon R. Turkevich; Edward J. Stemberger

(57) ABSTRACT

An apparatus is configured for testing a light emitting diode interface. The apparatus includes an integrated network device having a configuration register and logic for generating LED outputs based on detected network events and stored configuration register values. A light emitting diode is associated with the register. A processor is configured to send a signal to the integrated network device to set the configuration register to cause operation of the light emitting diode independent of network events. Hence, a light emitting diode interface of an integrated network device such as a network switch can be tested without sending data packets to the network device.

9 Claims, 3 Drawing Sheets

| Mode1 | Mode2 | LDC | LED A | LED B | Action at RESET |
|-------|-------|-----|-------|-------|-----------------|
| 0 | 0 | X | Programmable | Programmable | Undetermined while RESET# is asserted. Low for 4s after rising edge of RESET# |
| 0 | 1 | 0 | On=Full Duplex<br>Off=Half Duplex | On=Collision is occurring | Undetermined while RESET# is asserted. Low for 4s after rising edge of RESET# |
| | | 1 | Off=no 10 Mbs link<br>Blink=10 Mbs activity<br>Steady on=10 Mbs link | Off=no 100 Mbs link<br>Blink=100 Mbs activity<br>Steady on=100 Mbs link | |
| 1 | 0 | 0 | On=Full Duplex<br>Off=Half Duplex | On=Tx or Rx activity is occurring<br>Off=No activity | Undetermined while RESET# is asserted. 16 pulses @ 250 ms period after rising edge of RESET# |
| | | 1 | 10 Mbs link:<br>Off=no 10Mbs link<br>blink=collision<br>Steady on=10 Mbs link | 100 Mbs link:<br>Off=no 100 Mbs link<br>blink=collision<br>Steady on=100 Mbs link | |
| 1 | 1 | 0 | On=Full Duplex<br>Off=Half Duplex | On=100 Mbs<br>Off=10 Mbs | Undetermined while RESET# is asserted. |
| | | 1 | On=Tx or Rx activity is occurring<br>Off=No activity | On=Link is good<br>Off=Link is down | |

| Bit(s) | Name | | Default | Bit Type |
|---|---|---|---|---|
| | | | | _16 |
| 15 | LEDMODE1 | LED MODE1: If the two mode bits are both 0 the functions of the A and B LEDs are controlled by the other bits in this register.<br>If either of the two mode bits is set to 1 the functions of the A and B LEDs are controlled by the mode bits as in Figure 3 | 0 | RW |
| 14 | RES | Reserved. (Writes are ignored; reads return 0.) | 0 | RO |
| 13 | LEDA_FD | LEDA Full-Duplex: Enables the indication for LED A that Full-Duplex operation is enabled. | 0 | RW |
| 12 | LEDA_LS | LEDA Link Status: Enables the indication for LED A of the status of Link Pass | 1 | RW |
| 11 | LEDA_COL | LEDA Collision: Enables the indication for LED A of collision events. | 0 | RW |
| 10 | LEDA_TX | LEDA Transmit Activity: Enables the indication for LED A of transmit activity. | 0 | RW |
| 9 | LEDA_RX | LEDA Receive Activity: Enables the indication for LED A of receive activity. | 0 | RW |
| 8 | LEDA_SP | Speed: Enables the indication for LED B of Network speed (LED on=100Mbps) | 0 | RW |
| 7 | LEDMODE2 | LED MODE2: If the two mode bits are both 0 the functions of the A and B LEDs are controlled by the other bits in this register.<br>If either of the two mode bits is set to 1 the functions of the A and B LEDs are controlled by the mode bits as shown in Figure 3 | 1 | RW |
| 6 | RES | Reserved. (Writes are ignored; reads return 0.) | 0 | RO |
| 5 | LEDB_FD | LEDB Full-Duplex: Enables the indication for LED B that Full-Duplex operation is enabled. | 0 | RW |
| 4 | LEDB_LS | LEDB Link Status: Enables the indication for LED B the status of Link Pass. | 0 | RW |
| 3 | LEDB_COL | LEDB Collision: Enables the indication for LED B of collision events. | 0 | RW |
| 2 | LEDB_TX | LEDB Transmit Activity: Enables the indication for LED B of transmit activity. | 0 | RW |
| 1 | LEDB_RX | LEDB Receive Activity: Enables the indication for LED B of receive activity. | 0 | RW |
| 0 | LEDB_SP | Speed: Enables the indication for LED B of Network speed (LED on=100Mbps) | 0 | RW |

FIG. 2

| Mode1 | Mode2 | LDC | LED A | LED B | Action at RESET |
|---|---|---|---|---|---|
| 0 | 0 | X | Programmable | Programmable | Undetermined while RESET# is asserted. Low for 4s after rising edge of RESET# |
| 0 | 1 | 0 | On=Full Duplex<br>Off=Half Duplex | On=Collision is occurring | Undetermined while RESET# is asserted. |
| 0 | 1 | 1 | Off=no 10 Mbs link<br>Blink=10 Mbs activity<br>Steady on=10 Mbs link | Off=no 100 Mbs link<br>Blink=100 Mbs activity<br>Steady on=100 Mbs link | Low for 4s after rising edge of RESET# |
| 1 | 0 | 0 | On=Full Duplex<br>Off=Half Duplex | On=Tx or Rx activity is occurring<br>Off=No activity | Undetermined while RESET# is asserted. 16 pulses @ 250 ms period after rising edge of RESET# |
| 1 | 0 | 1 | 10 Mbs link:<br>Off=no 10Mbs link<br>blink=collision<br>Steady on=10 Mbs link | 100 Mbs link:<br>Off=no 100 Mbs link<br>blink=collision<br>Steady on=100 Mbs link | |
| 1 | 1 | 0 | On=Full Duplex<br>Off=Half Duplex | On=100 Mbs<br>Off=10 Mbs | Undetermined while RESET# is asserted. |
| 1 | 1 | 1 | On=Tx or Rx activity is occurring<br>Off=No activity | On=Link is good<br>Off=Link is down | |

FIG. 3

ARRANGEMENT FOR TESTING LIGHT EMITTING DIODE INTERFACE OF AN INTEGRATED NETWORK DEVICE

BACKGROUND OF THE INVENTION

1. Field of the Invention

The present invention relates to testing of integrated network devices such as integrated network switches configured for switching data packets between subnetworks.

2. Background Art

Local area networks use a network cable or other media to link stations on the network. Each local area network architecture uses a media access control (MAC) enabling network interface devices at each network node to access the network medium.

Switched local area networks are encountering increasing demands for higher speed connectivity, more flexible switching performance, and the ability to accommodate more complex network architectures. For example, commonly-assigned U.S. Pat. No. 5,953,335 discloses a network switch configured for switching layer 2 type Ethernet (IEEE 802.3) data packets between different network nodes; a received layer 2 type data packet may include a VLAN (virtual LAN) tagged frame according to IEEE 802.1p (802.1D) protocol that enables the network switch to perform more advanced switching operations. For example, the VLAN tag may specify another subnetwork (via a router) or a prescribed group of stations.

Light emitting diode (LED) interfaces are incorporated into integrated network devices such as an integrated network switch to drive LEDs for visual indications of network events occurring in the switch, for example, port transmit activity, port receive activity, port speed (10 Mbps or 100 Mbps) congestion at a port, a self test event, etc. In order to test the function of the LED interface, typically, an emulator is provided to send data packets to a network switch under test in such a manner to have the logic of the network switch cause activation of the LED. This testing procedure may be costly and time consuming in that this procedure requires actually sending and receiving data packets merely to turn the LED on and off.

SUMMARY OF THE INVENTION

There is a need to test the light emitting diode (LED) interface of an integrated network device without sending data packets to the network device for activation of the LED.

This and other needs are attained by the present invention, where a method for testing the light emitting diode interface of an integrated network device includes sending a signal to the integrated network device to set a configuration register in the integrated network device to cause operation of the selected light emitting diode, independent of network events.

Another aspect of the present invention provides an apparatus configured for testing a light emitting diode interface of an integrated network device. The apparatus includes an integrated network device having a register and logic for generating LED outputs based on detected network events and stored configuration register values. A light emitting diode is associated with the configuration register. A processor is configured to send a signal to the integrated network device to directly set the configuration register to cause operation of a light emitting diode, independent of the network events.

Hence, a light emitting diode associated with an integrated network device such as a network switch can be tested without sending data packets to the network device and bypassing the logic of the network device by directly causing operation of the light emitting diode.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

FIG. 2 is an LED configuration register of the integrated network device of FIG. 1.

FIG. 3 is an illustration of LED modes of operation for 10/100 ports of the integrated network device of FIG. 1.

BEST MODE FOR CARRYING OUT THE INVENTION

Figure 1:
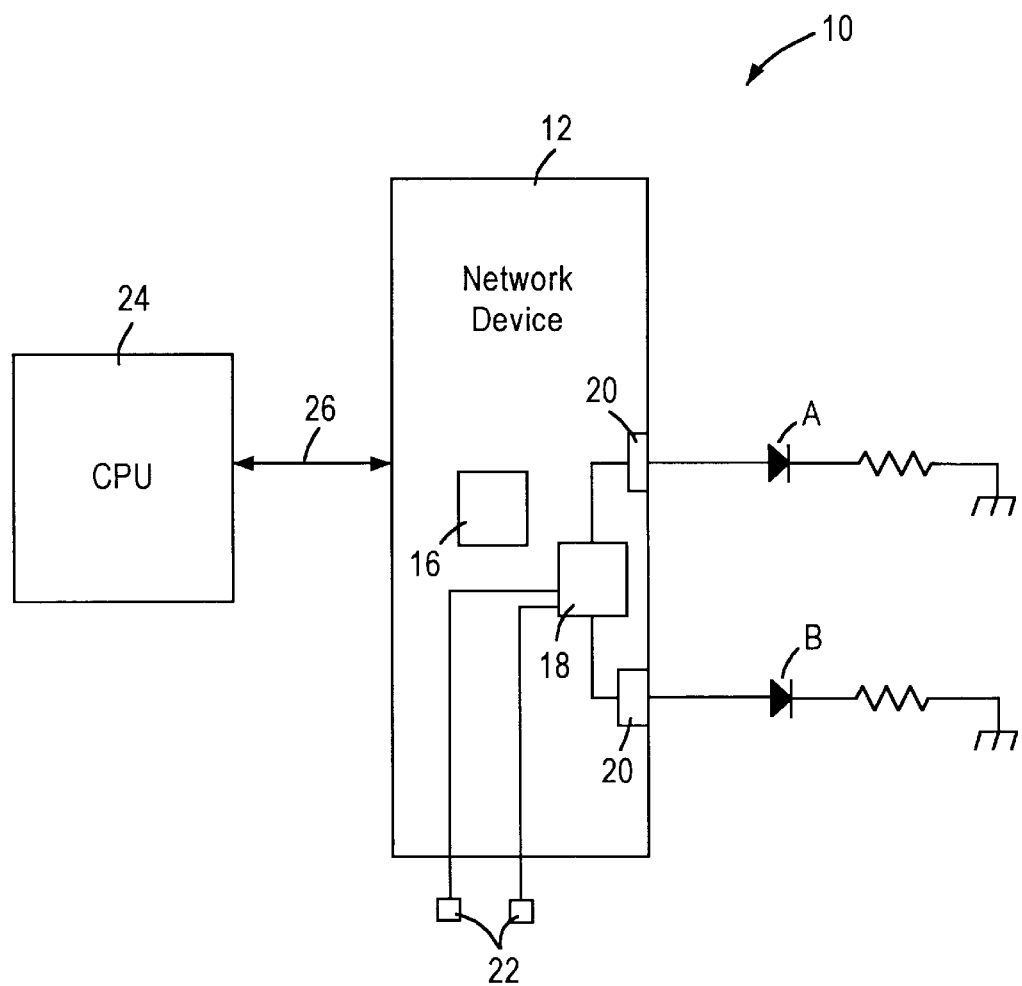
FIG. 1 is a block diagram of a system configured for testing the LED interface of an integrated network device in accordance with the principles of the present invention.

FIG. 1 is a block diagram illustrating a testing system 10 configured for testing an LED interface of an integrated (i.e., single chip) network device 12, for example a multiport switch having switch ports that include a media access controller (MAC), enabling transmission and reception of layer 2 type data packets between network stations at 10 or 100 Mbps according to, for example, media independent interface protocol. In particular, the network device 12 has a LED interface 20 for operating at least one LED employed as a visual indicator of operating functions of the device 12. In the illustrated embodiment, two LEDs are provided per port.

With reference to FIG. 3, typically, there are four operating modes of the LEDs. The LEDs A and B are set into various modes by two mode bits in an internal configuration register 16 (FIG. 2). For example, in a 0,0 bit mode, the LEDs are programmable. In a 0,1 bit mode, the activation of the LED indicates 10 or 100 Mbs activity. In a 1,0 bit mode, activation of the LED indicates a collision of data packets. In a 1,1 bit mode, transmit or receive activity is indicated by the LED.

The network device 12 includes logic 18 for generating LED outputs to the LED interfaces 20 based on detected network events from ports 22 and stored configuration register values in the configuration register 16.

In accordance with the invention, in order to test LED interfaces 20 independently of network events, a central processing unit or processor 24 sends a command 26 to the network device 12 to set the bits 7 and 15 in configuration register 16 of the network device 12 to 0,0 indicating that the LEDs should be turned on and then turned off. The logic 18 ecognizes the 0,0 output and thus turns the LED A or B on for a period of time and then turns the LED A or B off, independent of network events. After this, the LEDs can be tested by manually setting bits 13-8 and 5-0 of the configuration register 16 through the processor 24.

Thus, with the invention, there is no need to provide an emulator which sends data packets to the network device 12 in a manner which would cause the logic 18 of the network device 12 to activate an LED based on detected network events and stored configuration register values.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method of testing a light emitting diode interface of an integrated network device, the method comprising:

sending a signal to the integrated network device to directly set a configuration register in the integrated network device to cause operation of the selected light emitting diode, independent of network events.

2. The method of claim 1, wherein the command signal is sent by a processor to the integrated network device.

3. The method of claim 1, wherein the integrated network device is a network switch configured to receive and send data packets, the method including sending the signal to the network switch so as to bypass logic of the network switch associated with receiving data packets so that the light emitting diode is operated without employing the logic of the network switch associated with receiving data packets.

4. The method of claim 1, wherein a mode of the light emitting diode is set by two mode bits in the configuration register.

5. The method of claim 4, wherein the two mode bits are set to a certain configuration, with logic of the network switch causing operation of the light emitting diode based on the certain configuration.

6. An apparatus for testing a light emitting diode of an integrated network device, the apparatus comprising:

an integrated network device having a configuration register, and logic for generating light emitting diode outputs based on detected network events and stored configuration register values, a light emitting diode associated with the configuration register; and a processor configured to send a signal to the integrated network device to set the configuration register to cause operation of the light emitting diode, independent of the network events.

7. The apparatus of claim 6, wherein the processor is a central processing unit.

8. The apparatus of claim 6, wherein the integrated network device is an integrated network switch.

9. The apparatus of claim 6, wherein a mode of the light emitting diode is set by two mode bits in the configuration register, and wherein the two mode bits are received by the logic and the logic is configured to cause operation of the light emitting diode.

* * * * *